Figure 1:
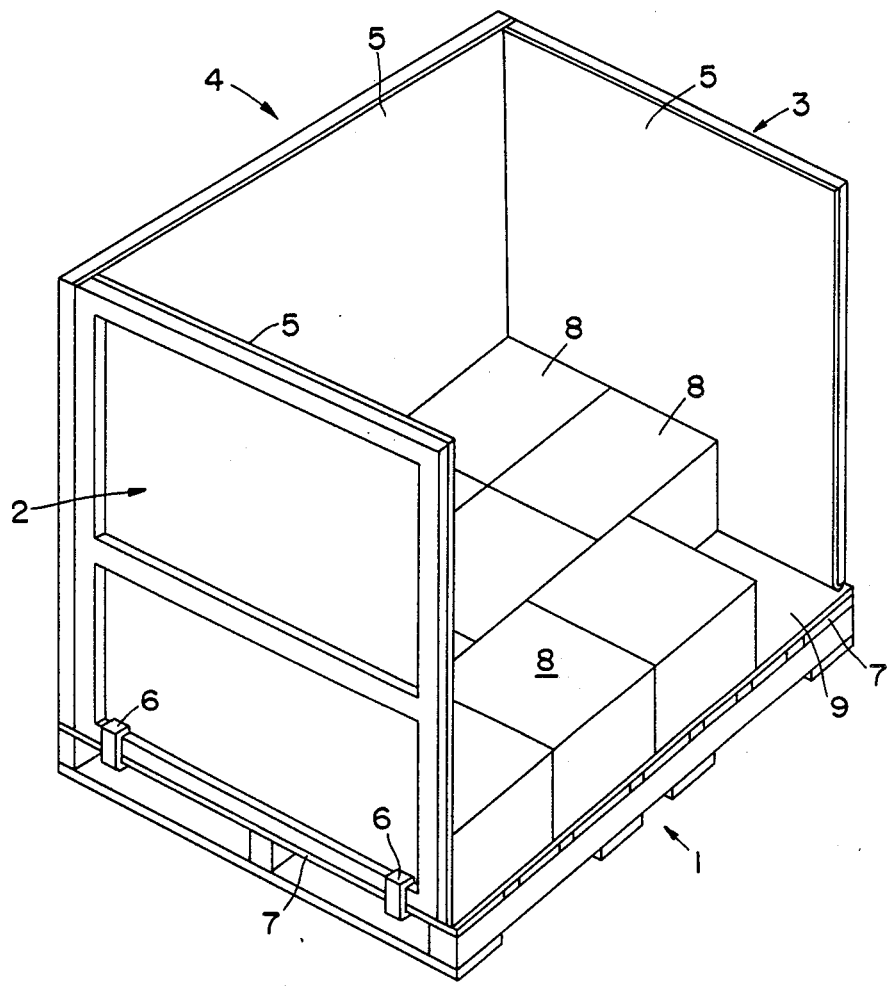

United States Patent [19]

Karpisek

[11] Patent Number: 4,981,702
[45] Date of Patent: Jan. 1, 1991

[54] METHOD FOR CONTROLLING THE COOLING IN GREEN CHEESE BLOCKS

[76] Inventor: Ladislav S. Karpisek, 86 Woodfield Boulevarde, Caringbah 2229 New South Wales, Australia

[21] Appl. No.: 253,141

[22] Filed: Oct. 4, 1988

[30] Foreign Application Priority Data

Oct. 8, 1987 [AU] Australia ................................ PI4782

[51] Int. Cl.$^5$ ..................... A23C 19/14; A23C 19/097
[52] U.S. Cl. ....................................... 426/36; 426/130; 426/524; 426/418; 426/232; 99/455; 99/646 C
[58] Field of Search ................. 426/36, 130, 582, 232, 426/524, 418; 99/455, 646 C

[56] References Cited

U.S. PATENT DOCUMENTS

| | | | |
|---|---|---|---|
| 463,189 | 11/1891 | Grieb | 426/418 |
| 2,423,300 | 7/1947 | Faehndrich | 426/418 |
| 2,621,486 | 12/1952 | Morrison | 426/418 |

Primary Examiner—Marianne Cintins
Attorney, Agent, or Firm—Louis Weinstein

[57] ABSTRACT

A method of controlling the cooling in green cheese blocks wherein the blocks are rectangular and are placed in identically oriented layers in a rigid rectangular container and wherein the dimensions of the blocks and the interior of the container are directly related so that the blocks can be placed in each layer so as to completely occupy the area provided for the layer and so that a corresponding surface of each block will be free of contact with adjacent blocks and then directing cooling onto the said corresponding surfaces.

7 Claims, 3 Drawing Sheets

METHOD FOR CONTROLLING THE COOLING IN GREEN CHEESE BLOCKS

This invention relates to the maturing step for green cheese.

It is common practice in the manufacture of cheddar and like cheese to pack blocks of green cheese having a size in the order of 360 mm X 280 mm X 180 mm in plastic film and then to place each block in a cardboard or wooden box. The sizes above are to be considered only as representative of typical block dimensions and not as limitive. The boxed cheese blocks are then placed on a pallet and the pallets are placed in a coolroom where the temperature of the blocks is reduced from 20–30 degrees C. (the temperature after the manufacturing and packing operation) to about 10 degrees C. which is the optimum for the maturing step.

At 10 degrees C. the activity of the bacteria in the green cheese responsible for the maturing process is manageable and by slight variations of the temperature and varying the length of time the cheese blocks are at that temperature it is possible to predict the qualities and characteristics of the cheese blocks at stages in the maturing process.

It has been found that there is a direct relationship between the quality throughout a block of cheese and the rate of cooling of the cheese block. In the present production method where pallet loads in a coolroom are subjected to circulating cold air some sides of the cheese blocks are exposed to more cooling air than others and this results in some blocks being cooled quicker than others. The blocks in the centre of a pallet load on the other hand are not directly subjected to cooling air and therefore cool more slowly. The result is that there can be a noticable difference in the final cheese quality both in the blocks in a batch and throughout a single block in the batch.

With this in mind and with a view to increasing the output of a cheese making plant it is an object of the invention to provide a method and apparatus whereby the cooling of green cheese blocks can be accomplished more rapidly than is the case with equipment now in common use but at the same time to cool in a manner which promotes uniformity in temperature drop throughout each block of green cheese in a batch of such blocks.

The invention in a further aspect is also concerned with the provision of cheese blocks which have substantially flat sides and square corners. This is of significance because the blocks of cheese after maturing are cut up into smaller commercial sized units and surface irregularities and lack of squareness can result in substantial wastage.

In the presently followed practices the boxed cheese blocks in their plastic wraps are stacked on a pallet. The boxes tend to hold the green cheese blocks to a shape but there is no pressure to form the blocks and maintain the shape. In the present proposal the wrapped green cheese blocks are loaded into a rigid container with internal dimension which are a function of the cheese block sizes so that there are substantially no spaces between the blocks and between the blocks and the sides of the container. The weight of the blocks one on the other exerts sufficient pressure to ensure that when the blocks leave the container they will have substantially flat sides and square corners.

With the forgoing in mind the method of the invention can be said to comprise a method of controlled cooling in green cheese blocks comprising the steps of providing a rigid container providing a storage zone defined by upstanding planar surfaces and a bottom, the area of said bottom having dimensions which are the aggregates of the width dimension between two oppositely disposed side surfaces and/or the length dimension between two oppositely disposed end surfaces of rectangular substantially uniformly sized cheese blocks to be loaded into said storage zone, placing cheese blocks in a first layer on said bottom so as to fully occupy the area of said bottom and so that all the blocks in the layer will have a corresponding surface free of contact with adjacent blocks, placing at least one further layer of cheese blocks on said first layer with the blocks in the further layer oriented the same as the blocks in said first layer, and directing cooling air onto said corresponding surfaces.

Figure 2:
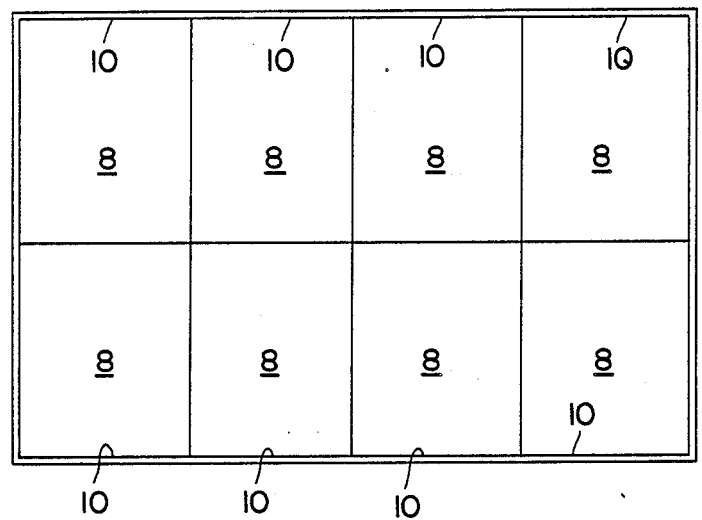
Figure 3:
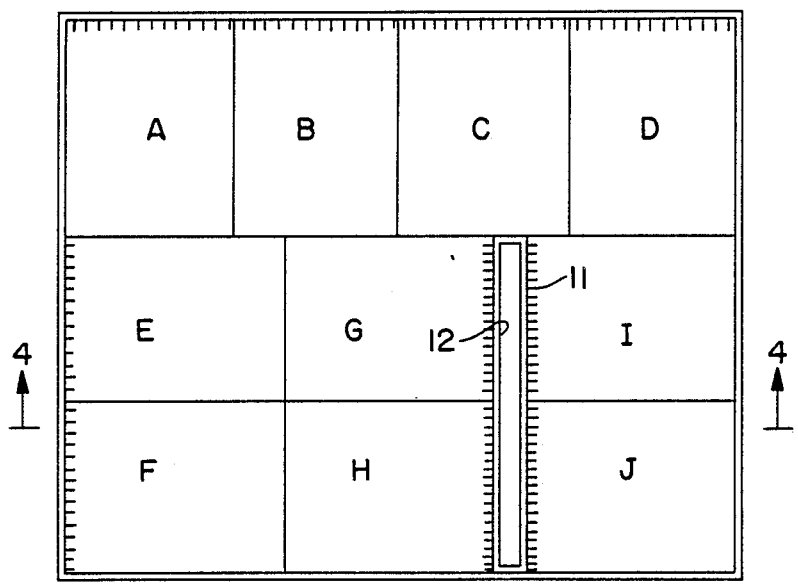
Figure 4:
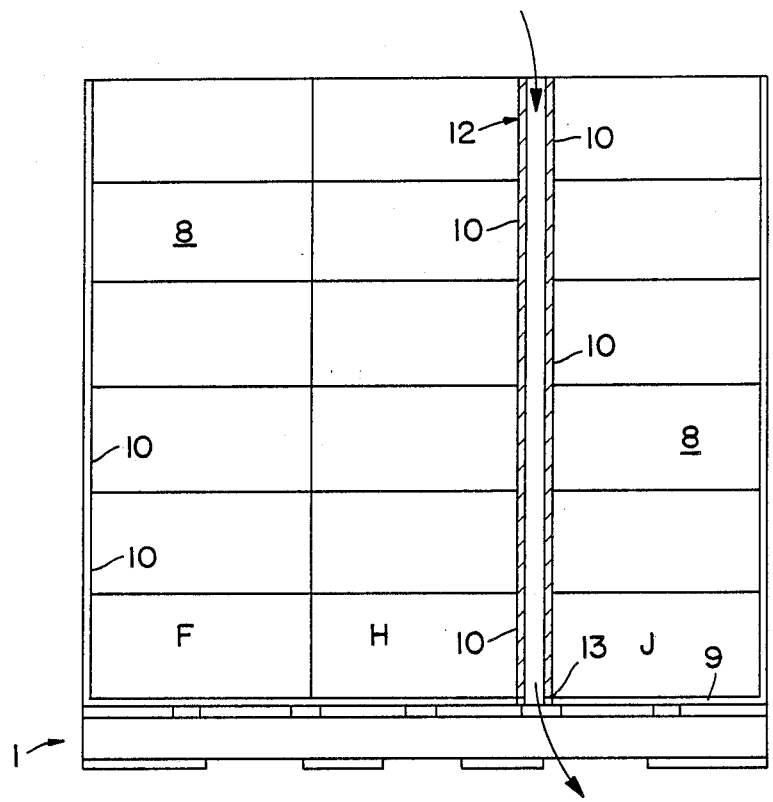

The method of the invention and apparatus for performing the invention will now be described with reference to the accompanying drawings in which:

FIG. 1 illustrates a typical form of container comprised of sides demountably attached to a pallet, FIG. 2 is a plan view of one block arrangement for the performance of the method of the invention, FIG. 3 is a plan view of a second block arrangement for the performance of the invention and FIG. 4 is a sectional elevation on the section line 4—4 of FIG. 3.

The preferred form of container is one having two sections each of two panels where adjacent uprights of the two panels of each section are hingedly interconnected by hinges allowing the panels to be uncoupled from each other and the other uprights of the panels of each section have co-operating half couplings which can co-operate with like half couplings on the other section uprights to allow the four panels to be assembled as a four sided enclosure. There are cleats on the panels to allow the panels to be demountably coupled to a pallet. Such a container is commercially known by the trade mark "Pallecon".

In FIG. 1 there is shown a container as described above with one panel removed. As illustrated there is a pallet 1 with panels 2, 3 and 4 each comprised of a frame made of square section tube with a cladding panel 5 fixed to the inner face of the frame. Cleats indicated 6 on the bottom rails of the panels 2 and 3 are engaged under the end battens 7 of the pallet and cleats not shown are passed between the battens and hook thereunder to secure the panel 4 (and the removed panel) to the pallet.

A partial load of cheese blocks 8 is illustrated and it is to be noted that the bottom of the container is provided by an overlay sheet 9 on top of the pallet battens.

Referring now to FIG. 2 there is shown a simple layout of cheese blocks where the blocks 8 fully occupy the interior of the container. With such an arrangement the end surfaces 10 of the blocks would be subjected to flows of cooling air and as a result there would be corresponding cooling effects in each block 8.

Referring now to FIG. 3, this represents the adaption of the principles of the invention to accommodate industry standards as now in operation. More specifically, it is industry practice to make green cheese blocks on nominal size 360 mm X 280 mm X 180 mm. It is also industry practice to place ten blocks in each layer of blocks on a pallet. This apparatus of the invention accommodates these industry standards by providing a container which has internal dimensions which have a direct ratio relationship to the standard cheese block sizes. In FIG. 3 it will be seen that in the block layout there are four blocks A,B,C,D, side by side, a group of four blocks E,F,G,H and a group of two blocks I and J.

It will be seen that with the standard cheese blocks there is a gap 11 which is not fully occupied. A tubular member 12, termed a chimney, is located in the gap 11 and it is open at top and bottom. The overlay sheet 9 has a hole 13 therein so that cooling air can be passed directly through the chimney, as shown in FIG. 4.

As will be clearly seen from FIG. 3 an end of each block, 8 is exposed in the sense that it can have a stream of cooling air directed against it as it is not in contact with an adjacent block. In accordance with the theory of the invention, which has been supported in experimental usage of the method in industrial situations, the exposure of like sized areas of the blocks to cooling air results in uniform cooling rates for the blocks and uniform quality of the cheese.

Whilst there is no direct impingement of the cooling air on the ends of blocks 8, the cladding 5 being a barrier to direct impingement, the continuous and localised application of cooling air to the cladding results in a steady heat transfer with resultant cooling of the cheese blocks.

The external application of cooling air streams to the "exposed" ends 10 of the blocks A to F (as indicated by the shaded areas) can be readily achieved by appropriate ducting. The cooling of the "exposed" ends of the blocks G to J (as indicated by the shaded areas) is provided by a flow of cooling air through the chimney 12 from, for example, the open top and exiting through the aligned hole in the bottom member 9 as shown by arrows in FIG. 4.

If the green cheese blocks 8 are of the dimensions suggested and the container is of related size the blocks 8 will readily take up an induced shape. For example, when loaded into the container the outer blocks will bear firmly against the cladding material thereby promoting flat outer faces for the blocks. As will be understood the compressive load in the cheese is substantial when there are, for example, six layers of cheese blocks in a container. This causes the blocks to compress and to bear firmly against each other in a tight fitting mass within the confines of the container and the abutting faces of the blocks will tend to be flat. The blocks will also tend to form with their faces substantially at right angles to each other.

In an optional shaping step for the cheese blocks prior to them being loaded into the container they can be individually subjected to pressure whilst enclosed in a mould with flat sides and square corners. Whilst green cheese blocks can be readily moulded to a shape in a mould by pressure, once shaped they are sufficiently stiff to maintain the given shape whilst they are loaded into the container. The prior-to-loading shaping step is not essential because the cheese blocks have a substantially rectangular shape after the forming and plastic wrapping step. However, it has been found that the shaping step prior to loading does result in matured cheese blocks of superior shape and squareness being available when the container is unloaded.

I claim:

1. A method of controlled cooling in green cheese blocks comprising the steps of providing a rigid container having a storage zone defined by upstanding planar surfaces and a bottom, the area of said bottom having dimensions which are the aggregates of the width dimension between two oppositely disposed side surfaces and the length dimension between two oppositely disposed end surfaces of rectangular substantially uniformly sized cheese blocks to be loaded into said storage zone, placing cheese blocks in a first layer on said bottom so as to fully occupy the area of said bottom and so that all the blocks in the layer will have surfaces which are free of contact with corresponding surfaces of adjacent blocks, placing at least one further layer of cheese blocks on said first layer with the blocks in each further layer oriented the same as the blocks in said first layer, and directing cooling air onto said corresponding surfaces.

2. The method of claim 1 further comprising the steps of:
providing a tubular passageway in an intermediate region of the rigid container and urging air through said passageway so that at least selected surfaces of said passageway provide cooling of surfaces of the green cheese blocks abutting said passageway;
said air being forced downwardly through the passageway.

3. A method for the controlled cooling of blocks of green cheese of rectangular prism form arranged in layers in a rigid container where the cooling results from subjecting a corresponding side of each prism to a cooling effect, the method comprising the steps of providing a container having a bottom and panels upstanding from the bottom with the panels defining an area the cross-sectional shape and size of which is a function of the length and breadth dimensions of the cheese blocks, placing a first layer of cheese blocks onto the container bottom and then adding further layers of cheese blocks with the cheese blocks in each layer fully occupying the cross-section of the container and so that the blocks in each layer have corresponding sides which are in abutting engagement with the inner faces of panels, and then directing cooling air onto exterior portions of the container panels opposite the inner portions of the panel faces against which the corresponding cheese block faces abut.

4. A method as claimed in claim 3 wherein the step of providing a container further includes providing a container wherein the area of the container bottom defined by the panels is rectangular with a length and breadth which are a function of the length and breadth of a cheese block.

5. A method as claimed in claim 3 wherein the step of providing a container further includes providing the container with a rectangular tube extending the height of the container and open through the bottom of the container where the tube is designed to have an external width dimension which is equal to twice the width of a cheese block and an external breadth dimension which is equal to the difference between four times the width of a cheese block and three times the length of a cheese block with the exterior of the tube providing some of the panels defining the area to receive cheese blocks.

6. A method of controlled cooling in green cheese blocks comprising the steps of providing a rigid container having a storage zone defined by upstanding planar surfaces and a bottom, the area of said bottom having dimensions which are the aggregates of at least the width dimension between two oppositely disposed side surfaces of rectangular substantially uniformly sized cheese blocks to be loaded into said storage zone, placing cheese blocks in a first layer on said bottom so as to fully occupy the area of said bottom and so that all the blocks in the layer will have surfaces which are free of contact with corresponding surfaces of adjacent blocks, placing at least one further layer of cheese blocks on said first layer with the blocks in each further layer oriented the same as the blocks in said first layer, and directing cooling air onto said corresponding surfaces.

7. A method of controlled cooling in green cheese blocks comprising the steps of providing a rigid container having a storage zone defined by upstanding planar surfaces and a bottom, the area of said bottom having dimensions which are the aggregates of at least the length dimension between two oppositely disposed end surfaces of rectangular substantially uniformly sized cheese blocks to be loaded into said storage zone, placing cheese blocks in a first layer on said bottom so as to fully occupy the area of said bottom and so that all the blocks in the layer will have surfaces which are free of contact with corresponding surfaces of adjacent blocks, placing at least one further layer of cheese blocks on said first layer with the blocks in each further layer oriented the same as the blocks in said first layer, and directing cooling air onto said corresponding surfaces.

* * * * *